(12) United States Patent
Nagaki et al.

(10) Patent No.: US 9,434,587 B2
(45) Date of Patent: Sep. 6, 2016

(54) WIRE GRIPPER

(71) Applicant: NAGAKI SEIKI CO., LTD., Osaka (JP)

(72) Inventors: Takayuki Nagaki, Osaka (JP); Kazude Fujiwara, Osaka (JP); Naohiro Hirayama, Osaka (JP); Tamotsu Iwama, Osaka (JP)

(73) Assignee: NAGAKI SEIKI CO., LTD., Osaka (JP)

( * ) Notice: Subject to any disclaimer, the term of this patent is extended or adjusted under 35 U.S.C. 154(b) by 0 days.

(21) Appl. No.: 14/430,140

(22) PCT Filed: Mar. 18, 2013

(86) PCT No.: PCT/JP2013/057593
§ 371 (c)(1),
(2) Date: Mar. 20, 2015

(87) PCT Pub. No.: WO2014/045616
PCT Pub. Date: Mar. 27, 2014

(65) Prior Publication Data
US 2015/0232314 A1    Aug. 20, 2015

(30) Foreign Application Priority Data

Sep. 21, 2012  (JP) .................................. 2012-208443

(51) Int. Cl.
*B66F 19/00* (2006.01)
(52) U.S. Cl.
CPC ...................................... *B66F 19/00* (2013.01)
(58) Field of Classification Search
CPC ........................................................ B66F 19/00

USPC ................... 294/104, 116, 103.1, 103.2, 106
See application file for complete search history.

(56) References Cited

U.S. PATENT DOCUMENTS

| D633,784 S   * | 3/2011 | Iwama .......................... D8/395 |
| 8,540,215 B2 * | 9/2013 | Iwama ................... 254/134.3 R |
| D732,362 S   * | 6/2015 | Nagaki ............................ D8/52 |
| 2012/0012799 A1* | 1/2012 | Iwama ................... 254/134.3 R |
| 2012/0132874 A1* | 5/2012 | Iwama ................... 254/134.3 R |

FOREIGN PATENT DOCUMENTS

| JP | 10-126935 A | 5/1998 |
| JP | 2004-242477 A | 8/2004 |
| JP | 2009-90881 A | 4/2009 |

OTHER PUBLICATIONS

International Search Report mailed May 7, 2013, in corresponding International Patent Application No. PCT/JP2013/057593.

* cited by examiner

*Primary Examiner* — Paul T Chin
(74) *Attorney, Agent, or Firm* — Arent Fox LLP

(57) ABSTRACT

A wire gripper of the present invention is to provide with a lightweight and robust wire gripper; wherein the wire gripper is provided with a stationary gripping body having a wire-like body pressing-down portion; a swinging member swingably attached to the stationary gripping body by a supporting shaft; a movable gripping body swung according to swinging of the swinging member; and a connection member connected to the swinging member and swinging the swinging member, wherein the stationary gripping body is provided with a circular ridge around a hole in which the supporting shaft for attaching the swinging member is inserted in order to protect the supporting shaft.

4 Claims, 16 Drawing Sheets

WIRE GRIPPER

CROSS-REFERENCE TO RELATED APPLICATION(S)

This application is a National Stage entry of International Patent Application No. PCT/JP2013/057593, filed Mar. 18, 2013, which claims the foreign priority of Japanese Patent Application No. 2012-208443, filed Sep. 21, 2012. The disclosure of the prior applications are hereby incorporated by reference in their entireties.

TECHNICAL FIELD

The present invention relates to a wire gripper which is attached to an apparatus for pulling a wire when a wire-allocating work or the like is performed and is used for an application for gripping the wire.

BACKGROUND ART

As a conventional typical wire gripper used when a wire, an electrical wire, a cable or the like is wire-tensioned, for example, there is one shown in FIG. 5 of Patent Document 1. The wire gripper grips a covered electrical wire 6 between a reception metal 3 provided in a wire gripper main body 1 and a pushing metal 5 attached to a swinging lever 2. When a handle 4 is operated, the swinging lever 2 is swung so that the pushing metal 5 is moved toward the reception metal 3.

PRIOR ART TECHNICAL DOCUMENT

Patent Document

Patent Document 1: Japanese Patent No. 3415370

SUMMARY OF INVENTION

Problem to be Solved by the Invention

In such a wire gripper, a swinging lever 2 is swingably attached to a wire gripper main body 1 by a shaft made of metal.

In the wire gripper 1, when a handle 4 is pulled while a tension of an overhead power distribution line under construction is being held, an excessive force, for example, a shearing force, is applied to the shaft attached to the swinging lever 2 and the wire gripper main body 1, which may result in damage to the shaft or a periphery of a hole of the wire gripper main body 1.

However, when the wire gripper main body 1 or the shaft is made thick in order to increase robustness, a weight is increased so that it becomes difficult to use the wire gripper 1 as a wire gripper to be used at a high place.

Therefore, a main object of the present invention is to provide a lightweight and robust wire gripper.

Means for Solving Problem

A wire gripper of the present invention described in claim 1 is a wire gripper provided with a stationary gripping body having a wire-like body pressing-down portion; a swinging member swingably attached to the stationary gripping body by a supporting shaft; a movable gripping body swung toward the wire-like body pressing-down portion of the stationary gripping body according to swinging of the swinging member and having a wire-like body holding portion; and a connection member connected to the swinging member and swinging the swinging member, wherein the stationary gripping body is provided with a circular ridge around a hole in which the supporting shaft for attaching the swinging member is inserted in order to protect the supporting shaft.

A wire gripper of the present invention described in claim 2 is the wire gripper described in claim 1, wherein another arc-shaped ridge different from the circular ridge is formed at a position spaced from a hole edge of the hole in which the supporting shaft is inserted along the hole edge.

A wire gripper of the present invention described in claim 3 is a wire gripper provided with a stationary gripping body having a wire-like body pressing-down portion; a swinging member swingably attached to the stationary gripping body by a supporting shaft; a movable gripping body swung toward the wire-like body pressing-down portion of the stationary gripping body according to swinging of the swinging member and having a wire-like body holding portion; and a connection member connected to the swinging member and swinging the swinging member, wherein the stationary gripping body is provided with a ridge extending toward the wire-like pressing-down portion in the vicinity of a hole in which a supporting shaft for attaching the swinging member is inserted.

A wire gripper of the present invention described in claim 4 is the wire gripper described in claim 3, wherein the ridge is linear, and as the ridge, a plurality of ridges are provided at equal intervals from a hole edge of the hole.

A wire gripper of the present invention described in claim 5 is the wire gripper described in any one of claims 1 to 4, wherein the circular ridge is provided on a side attached with the connection member, and the ridge extending toward the wire-like body pressing-down portion is provided on a side opposite to the side attached with the connection member.

Effect of Invention

According to the present invention, since a wire gripper is provided with a stationary gripping body having a wire-like body pressing-down portion, a swinging member swingably attached to the stationary gripping body by a supporting shaft, a movable gripping body swung toward the wire-like body holding portion of the stationary gripping body according to swinging of the swinging member and having a wire-like body holding portion, and a connection member connected to the swinging member and swinging the swinging member, wherein the stationary gripping body is provided with a circular ridge around a hole in which the supporting shaft for attaching the swinging member is inserted in order to protect the supporting shaft, a lightweight and robust wire gripper can be provided.

According to the invention described in claim 2, since another arc-shaped ridge different from the circular ridge is formed at a position spaced from a hole edge of the hole in which the supporting shaft is inserted along the hole edge, the periphery of the hole in which the supporting shaft is inserted can be made further robust.

According to the invention described in claim 3, since a wire gripper is provided with a stationary gripping body having a wire-like body pressing-down portion, a swinging member swingably attached to the stationary gripping body by a supporting shaft, a movable gripping body swung toward the wire-like body holding portion of the stationary gripping body according to swinging of the swinging member and having a wire-like body holding portion, and a connection member connected to the swinging member and swinging the swinging member, wherein the stationary gripping body is provided with a ridge extending toward the wire-like body pressing-down portion in the vicinity of the supporting shaft attached with the swinging member, a lightweight and robust wire gripper can be provided.

According to the invention described in claim 4, since the ridge is linear, and as the ridge, a plurality of ridges are provided at equal intervals from a hole edge of the hole, the periphery of the hole in which the supporting shaft is inserted is made further robust.

According to the invention described in claim 5, since the circular ridge is provided on a side attached with the connection member, the ridge extending toward the wire-like body pressing-down portion is provided on a side opposite to the side attached with the connection member, a region where the connection member is attached is made further robust.

The above object, and other objects, features, and merits of the present invention will be made further apparent from explanation of a mode for carrying out the invention made with reference to the drawings.

MODE FOR CARRYING OUT THE INVENTION

Figure 1:
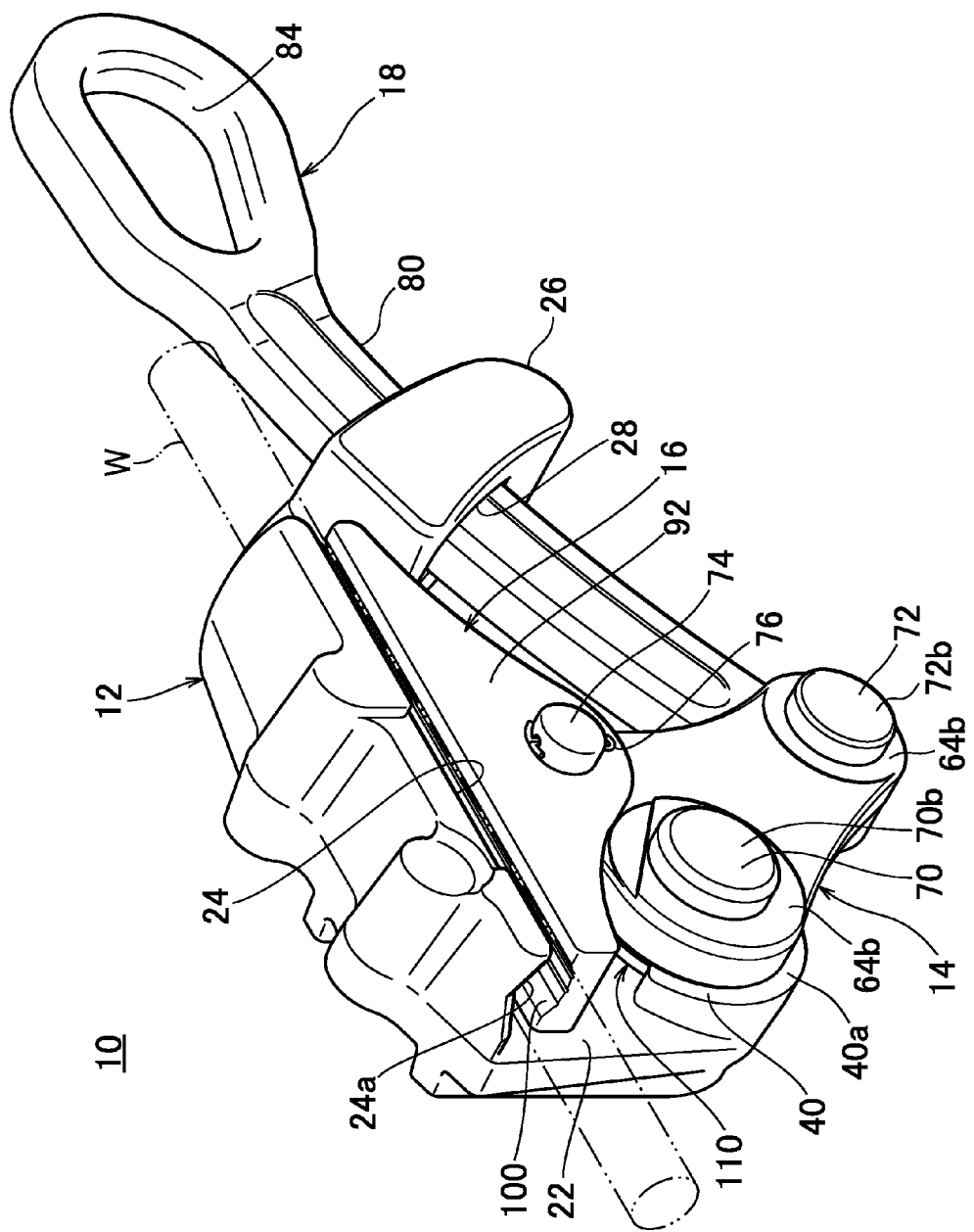
FIG. 1 is a perspective view showing a whole configuration of a wire gripper which is an embodiment according to the present invention.
Figure 2:
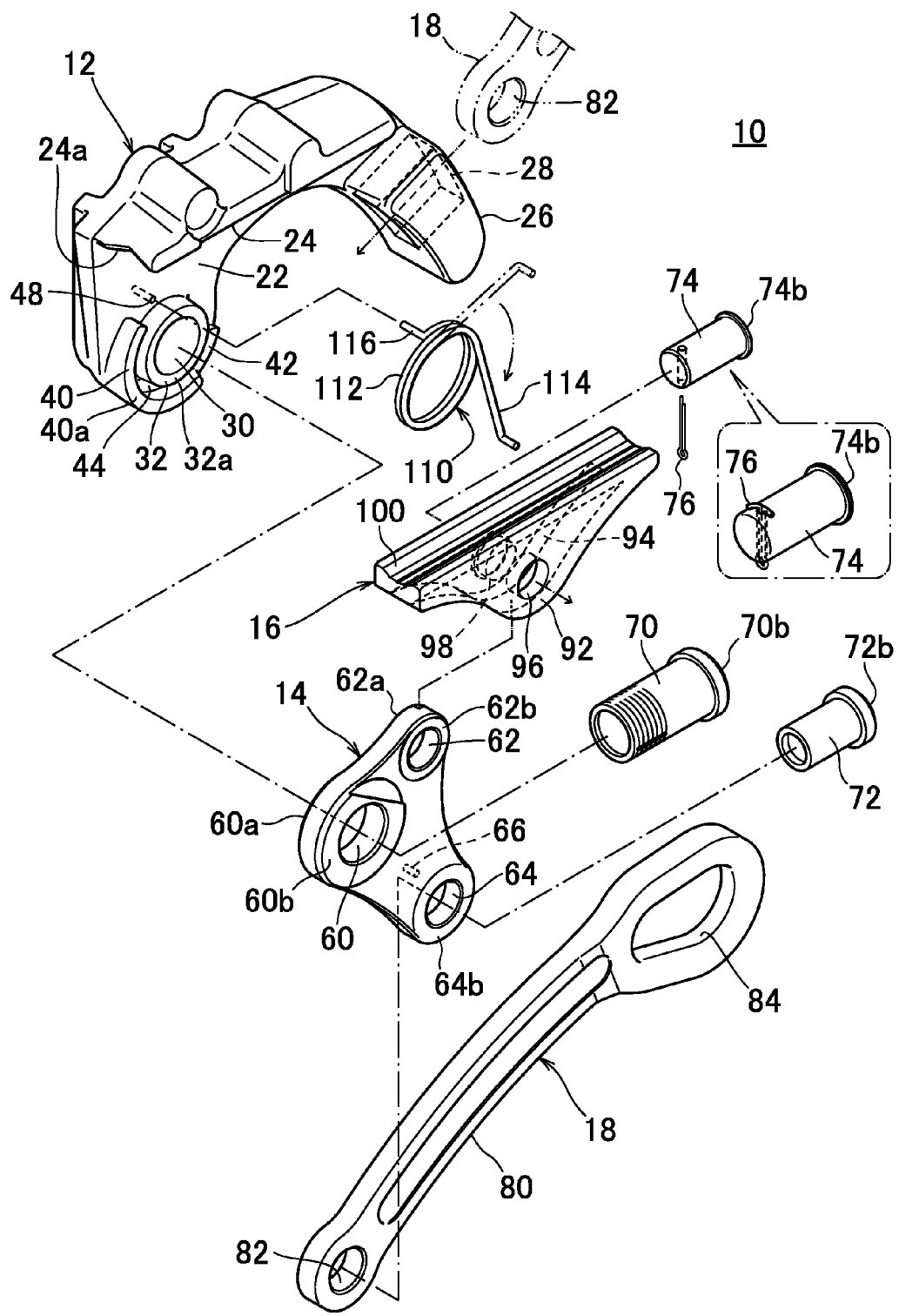
FIG. 2 is a perspective illustration view showing constituent parts constituting the wire gripper shown in FIG. 1.
Figure 3:
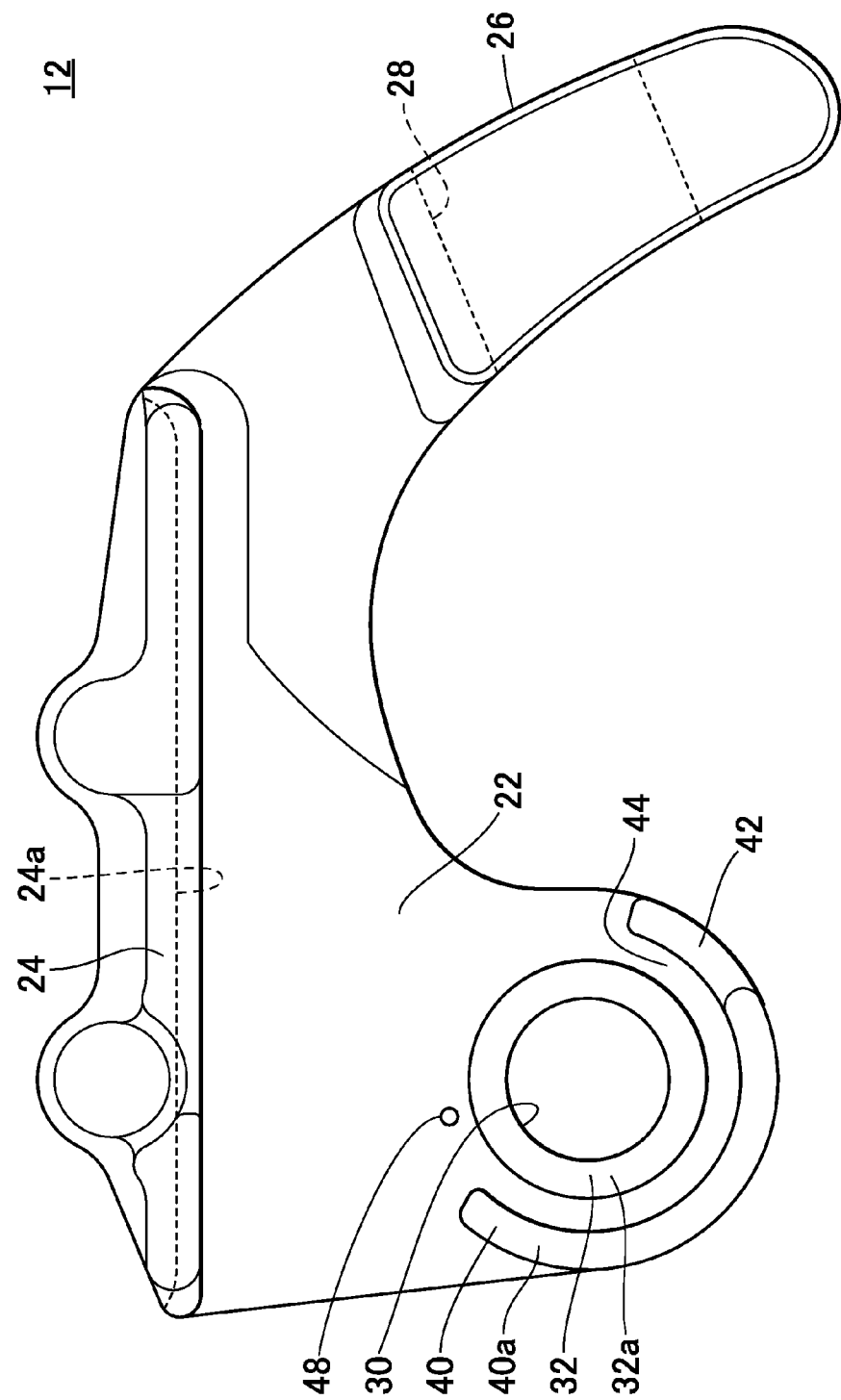
FIG. 3 is a front illustration view of a stationary gripping body.
Figure 4:
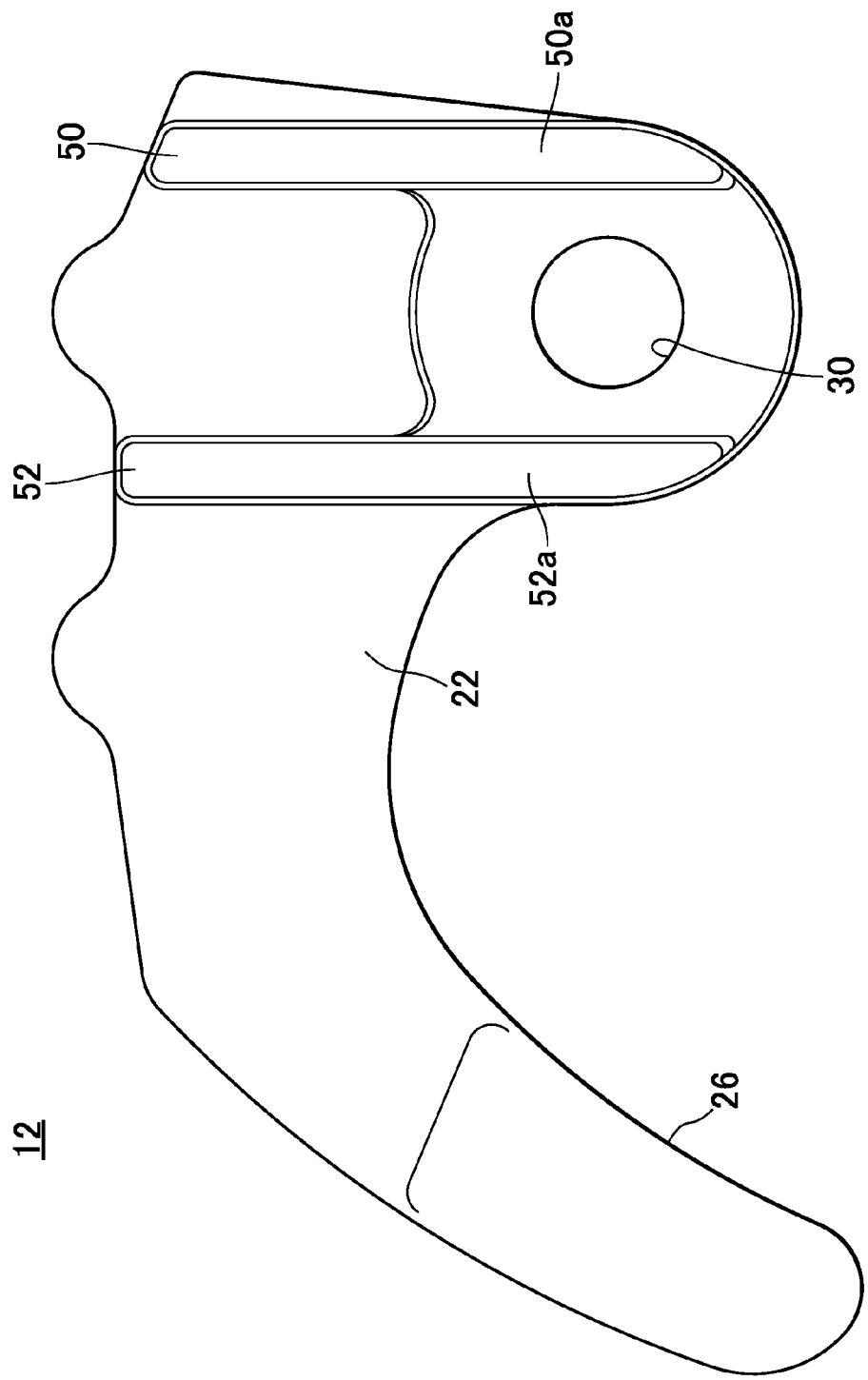
FIG. 4 is a back illustration view of the stationary gripping body.
Figure 5A:
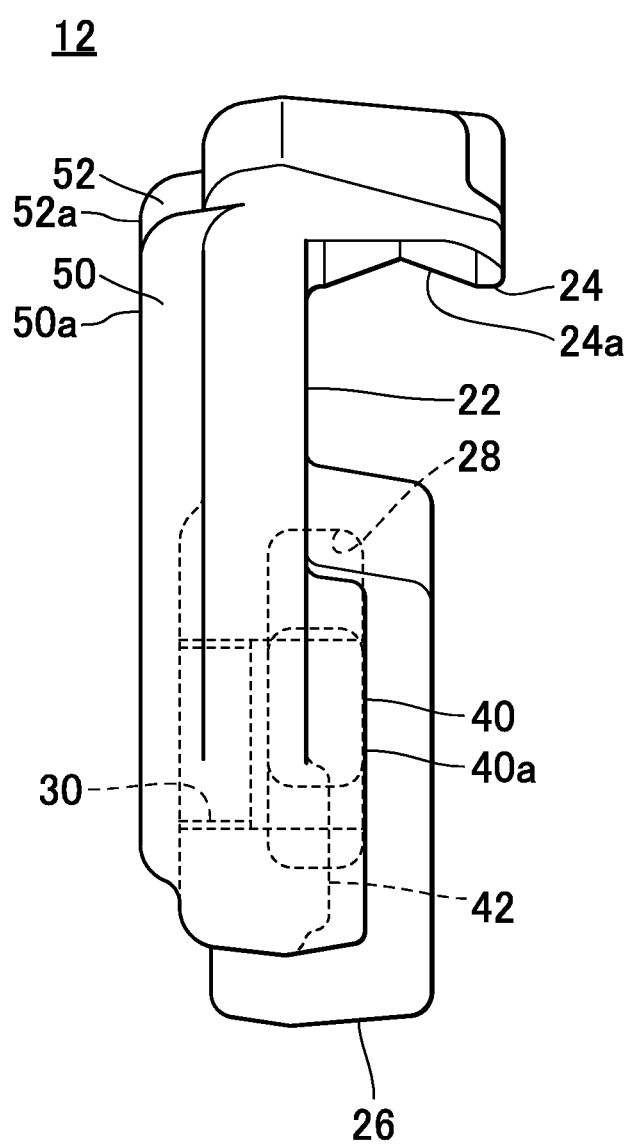
FIG. 5A is a left side illustration view of the stationary gripping body.
Figure 5B:
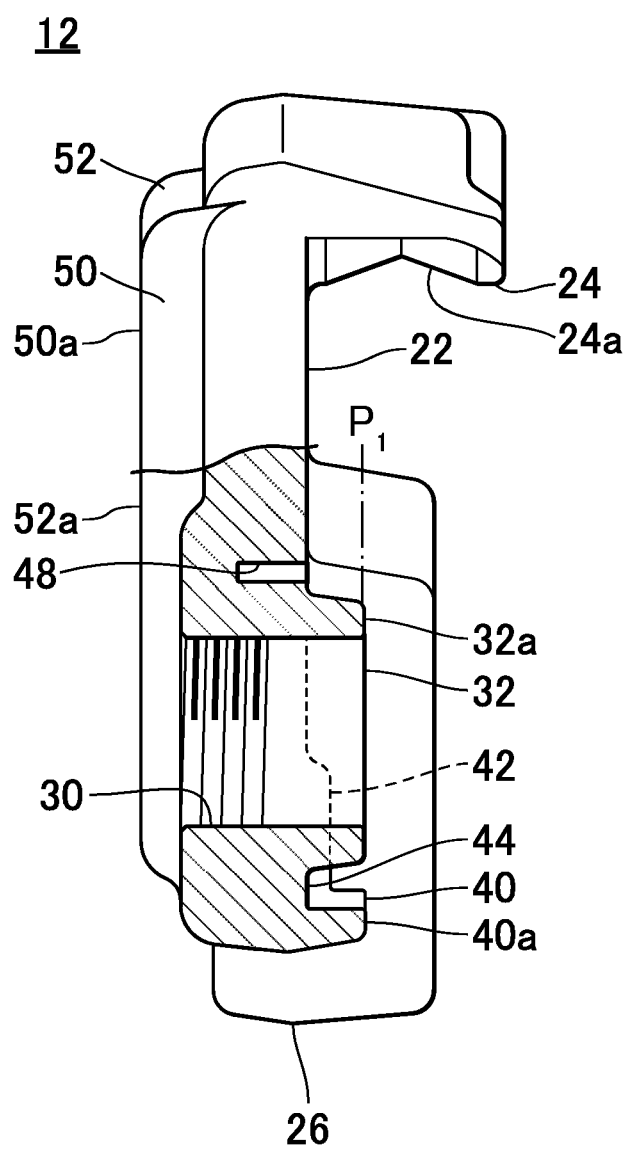
FIG. 5B is a left side illustration view where a portion of the stationary gripping body is shown in a section.
Figure 6:
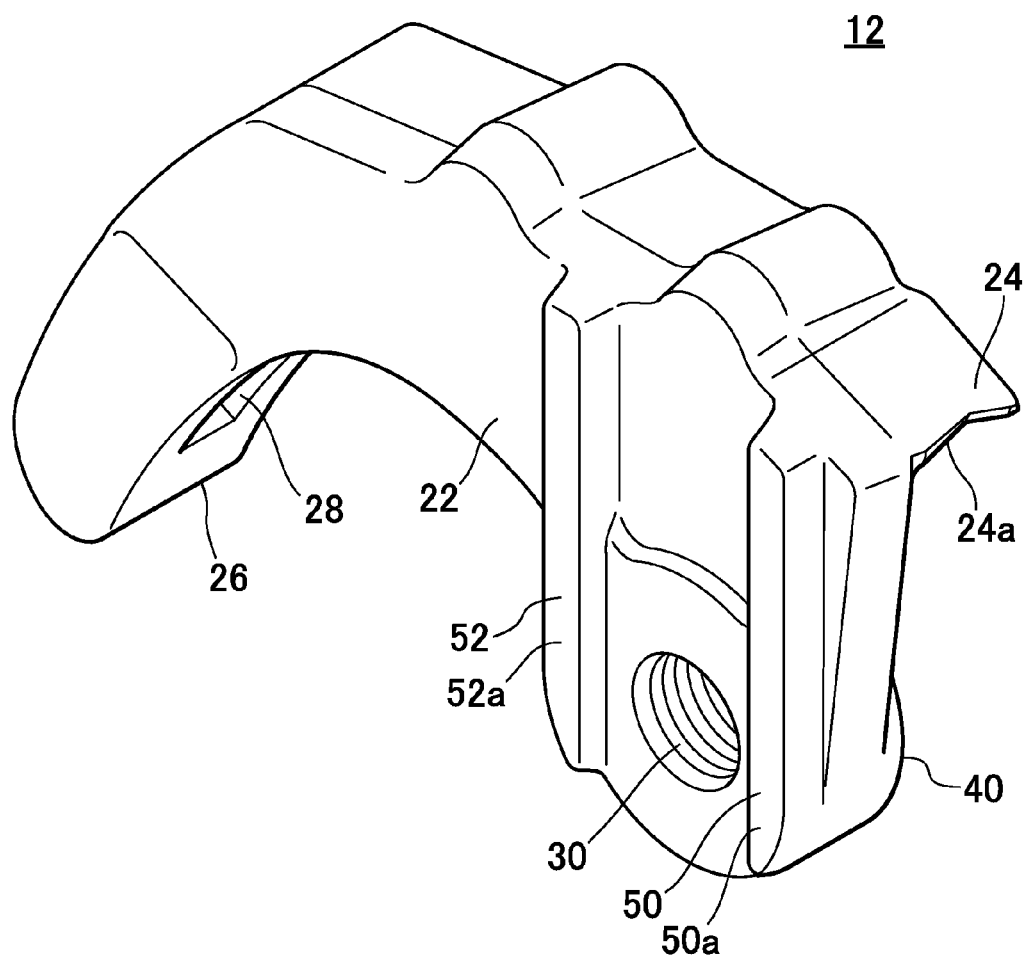
FIG. 6 is a perspective illustration view showing a main section of the stationary gripping body.

An embodiment of the present invention will be described below with reference to the drawings, and it will be submitted for understanding of the present invention. It should be noted that the embodiment described below is one embodied example and it does not limit the technical scope of the present invention.

A wire gripper 10 which is an embodiment of the present invention is provided with a stationary gripping body 12 having a wire-like body pressing-down portion 24, a swinging member 14 swingably attached to the stationary gripping body 12 by a supporting shaft 70, a movable gripping body 16 swung toward the wire-like body pressing-down portion 24 of the stationary gripping baby 12 according to swinging of the swinging member 14 and having a wire-like body holding portion, and a connection member 18 connected to the swinging member 14 and swinging the swinging member 14.

The stationary gripping body 12 has an approximately U shape in a front view, and it is provided with an approximately L-shaped main body 22, the wire-like body pressing-down portion 24 formed on an upper portion of the main body 22 so as to extend in a longitudinal direction thereof, and a connection member guiding portion 26 provided at a rear portion of the main body 22 so as to project rearward of a lower portion of the main body 22.

The main body 22 has a horizontal portion extending to a side of pulling the connection member 18 (a direction "a") and a side of pushing back the connection member 18 (a direction "b"), and a vertically-extending portion provided on the horizontal portion vertically on the side of pushing back (the direction "b").

The wire-like body pressing-down portion 24 has an eaves shape projecting toward a near side on upper portions of the horizontal portion and the vertically-extending portion of the main body 22 and an the connection member guiding portion 26, and a lower face thereof is formed with a clamping groove 24a.

The connection member guiding portion 26 extends from the side of the horizontal portion of the main body 22 of pulling the connection member 18 (the direction "a") in a downward direction on the opposite side of the wire-like body pressing-down portion 24.

The connection member guiding portion 26 is bored with a guide hole 28 inserted with the connection member 18 to guide the connection member 18, and the connection member 18 swingably pivoted to the swinging member 14 is inserted in the guide hole 28 and is held by the connection member guiding portion 26.

The stationary gripping body 12 is provided with a supporting shaft hole 30 for pivoting the swinging member 14 by a supporting shaft 70 at the vertically-extending portion of the main body 22 at the front portion so as to extend through the vertically-extending portion.

The supporting shaft hole 30 is a circular hole bored from a near side (a front face side) of the main body 22 to a far side (a back face side) and it extends horizontally.

The stationary gripping body 12 is provided with a ridge 32 provided around a hole edge of the supporting shaft hole 30 so as to project along the hole edge in order to protect the supporting shaft 70 pivoting the swinging member 14.

The ridge 32 is a circular rib in a front view and continuously provided from a lower portion of the supporting shaft hole 30 to a rear side thereof through a front side and an upper portion thereof.

The ridge 32 projects from the main body 22 in a direction where an outer peripheral edge of the hole of the supporting shaft hole 30 extends (a direction where an axial center 70a of the supporting shaft 70 extends).

The ridge 32 has a top portion 32a which is planar and spreads in a vertical direction which is a direction intersecting a direction where the outer hole peripheral edge of the hole of the supporting shaft hole 30 extends. The ridge 32 has an approximately trapezoidal shape in a section where the top portion 32a is provided with a flat face parallel to a near-side face of the main body 22 and the clamping groove 24a of the wire-like body pressing-down portion 24 and a peripheral edge of the top portion 32a extends in a direction of intersecting the near-side face of the main body 22. The ridge 32 is configured such that a height thereof has a length approximately equal to a width of the main body 22, and it has approximately the same sectional shape and approximately the same height over a whole circumstance thereof.

The ridge 32 is formed in a taper shape where the width thereof gradually becomes narrower toward an upper end (the top portion 32a), and a width of a lower end portion thereof is approximately equal to the width of the main body 22.

The ridge 32 constitutes a seat on which the swinging member 14 is placed.

The ridge 32 is formed integrally with the main body 22 from metal.

Another arc-shaped ridge 40 is formed at a position spaced from the hole edge of the supporting shaft hole 30 in which the supporting shaft 70 is inserted along the hole edge separately from the ridge 32.

The arc-shaped ridge 40 is an arc-shaped rib in a plan view continuously provided from a lower portion of the supporting shaft hole 30 to a front side thereof.

The ridge 40 projects from the main body 22 in the direction where the outer peripheral edge of the hole of the supporting shaft hole 30 extends (the direction where the axial center 70a of the supporting shaft 70 extends).

The ridge 40 is cut off at a lower portion thereof in a rear direction [a direction of pulling the connection member 18 (the direction "a" shown in FIG. 15)], so that it is provided with a space 42 for allowing movement of a spring.

The ridge 40 is configured in a circular shape concentric with the ridge 32 so as to surround the ridge 32 and space from the outer peripheral edge of the ridge 32 by approximately the same distance, so that a spring groove 44 is formed between the ridge 40 and the ridge 32.

The ridge 40 has a top portion 40a which is planar and spreads in a vertical direction which is a direction intersecting a direction where the outer hole peripheral edge of the hole of the supporting shaft hole 30 extends. The ridge 40 has an approximately trapezoidal shape in a section where the top portion 40a is provided with a flat face parallel to a near-side face of the main body 22 and the clamping groove 24a of the wire-like body pressing-down portion 24, and a peripheral edge of the top portion 40a extends in a direction of intersecting the near-side face of the main body 22.

The ridge 40 has a height approximately equal to the height of the ridge 32, it is configured such that the height has a length approximately equal to the width of the main body 22, and it has approximately the same sectional shape and approximately the same height over a whole circumstance thereof.

The ridge 40 is formed in a taper shape where the width thereof gradually becomes narrower toward an upper end (the top portion 40a), and a width of a lower end portion thereof is approximately equal to the width of the main body 22.

The ridge 40 constitutes a seat on which the swinging member 14 is placed.

The ridge 40 is formed integrally with the main body 22 from metal.

The stationary gripping body 12 is provided with a plurality of linear ridges in the vicinity of the supporting shaft hole 30 in which the supporting shaft 70 is inserted for attaching the swinging member 14 on an opposite face of the stationary gripping body 12 of the face on which the ridge 32 and the ridge 40 have been formed. In this embodiment, a first linear ridge 50 and a second linear ridge 52 extending from the lower portion of the vertically-extending portion toward the wire-like body pressing-down portion 24 are provided on the vertically-extending portion of the main body 22 at a proper interval.

The first linear ridge 50 and the second linear ridge 52 are linear, and top portions thereof are planar, they have approximately trapezoidal shapes in a section where the top portions are provided with a flat face parallel to the near-side face of the main body 22, they are configured such that the heights thereof have lengths approximately equal to a width of the main body 22, and they each have approximately the same sectional shape and approximately the same height over whole circumstances thereof.

The first linear ridge 50 and the second linear ridge 52 are provided so as to be spaced from the hole edge of the supporting shaft hole 30 by a proper distance and are provided in parallel to each other. The same interval is set between the first linear ridge 50 and the supporting shaft hole 30 and between the second linear ridge 52 and the supporting shaft hole 30. The first linear ridge 50 and the second linear ridge 52 extend in a direction intersecting a direction of pulling the connection member 18 (the direction "a" shown in FIG. 15).

The circular ridge 32 is provided on the vertically-extending portion of the main body 22 on the side of attaching the connection member 18 (the side of attaching the swinging member 14), while the first linear ridge 50 and the second linear ridge 52 extending toward the wire-like body pressing-down portion 24 are provided on the vertically-extending portion of the main body 22 on the opposite face of the side of attaching the connection member 18.

The swinging member 14 has an approximately triangular shape in a front view, and it is configured such that an inner angle portion at a front upper portion thereof is bored with a stationary gripping body attaching hole 60 in which the supporting shaft 70 is inserted, an inner angle portion at a rear upper portion thereof is bored with a movable gripping body attaching hole 62 in which a swinging shaft 74 is inserted, and an inner angle portion at a rear lower portion thereof is bored with a connection member attaching hole 64 in which a swinging shaft 72 is inserted.

Portions around the stationary gripping body attaching hole 60, the movable gripping body attaching hole 62 and the connection member attaching hole 64 bulge on both the near-side face and the far-side face of the swinging member 14 so as to be higher than the other portion of the swinging member 14, and top portions of the bulging portions are vertical flat faces orthogonal to a direction where the peripheral edges of the holes extent. That is, a top portion 60a of the bulging portion around the far-side hole of the stationary gripping body attaching hole 60 and a top portion 60b of the bulging portion around the near-side hole of the stationary gripping body attaching hole 60, a top portion 62a of the bulging portion around the far-side hole of the movable gripping body attaching hole 62 and a top portion 62b of the bulging portion around the far-side hole of the movable gripping body attaching hole 62, and a top portion 64a of the bulging portion around the far-side hole of the connection member attaching hole 64 and a top portion 64b of the bulging portion around the far-side hole of the connection member attaching hole 64 are formed in parallel and they are orthogonal to a direction where the hole edges (outer peripheral edges of the holes) of the stationary gripping body attaching hole 60, the movable gripping body attaching hole 62 and the connection member attaching hole 64 extend.

A sliding contact face of the top portion 60a of the bulging portion around the far-side hole formed around the near side of the stationary gripping body attaching hole 60 (a sliding face coming in sliding contact with the top portion 32a of the ridge 32 and the top portion 40a of the ridge 40) is formed on a vertical face so as to be orthogonal to the rotation axis (an axial center of the supporting shaft 70) of the swinging member 14 and be parallel to the clamping groove 24a of the stationary gripping body 12 and the clamping groove 100 of the movable gripping body 16.

Sliding contact faces of the top portions 62a of the bulging portions around the far side hole and the top portion 62b of the bulging portion around the near side hole formed around the far-side and the near-side of the movable gripping body attaching hole 62 (sliding contact faces coming in contact with the attaching faces of the movable gripping body 16) are formed on vertical faces so as to be orthogonal to the rotation axis of the movable gripping body 16 (an axial center of the swinging shaft 74) and be parallel to the clamping groove 24a of the stationary gripping body 12 and the clamping groove 100 of the movable gripping body 16.

A sliding contact face of the top portion 64a of the bulging portion around the far-side hole formed around the far-side of the connection member attaching hole 64 (a sliding contact face coming in sliding contact with the attaching face of the connection member 18) is formed on a vertical face so as to be orthogonal to the rotation axis of the connection member 18 (an axial center of the swinging shaft 72) and be parallel to the clamping groove 24a of the stationary gripping body 12 and the clamping groove 100 of the movable gripping body 16.

The swinging member 14 is joined to the ridge 32 provided on the stationary gripping body 12, and the supporting hole 30 and the stationary gripping body attaching hole 60 are aligned with each other, so that the swinging member 14 is swingably attached to the fixing gripping body 12 at one end portion of the swinging member 14 by the supporting shaft 70 serving as a pivoting shaft.

The swinging member 14 is swingably attached with the connection member 18 by the swinging shaft 72 in such a state that one end of the connection member 18 is joined to another end portion of the swinging member 14 and a swinging member attaching hole 82 of the connection member 18 and the connection member attaching hole 64 of the swinging member 14 are aligned with each other.

Further, the swinging member 14 is swingably attached with the movable gripping body 16 by the swinging shaft 74 in the movable gripping body attaching hole 62 provided at a position adjacent to the stationary gripping body attaching hole 60.

The connection member 18 is a rod-shaped body having a longitudinal direction, where a swinging member attaching hole 82 is bored at a front portion of a prismatic connection member main body 80 and a connection hole 84 is formed at a rear portion of the connection member main body 80.

The connection member attaching hole 64 of the swinging member 14 and the swinging member attaching hole 82 of the connection member 18 have the same diameter, and the swinging member 14 and the connection member 18 are arranged in parallel such that outer peripheral edges of the holes are parallel to each other. The connection member 18 is swingably attached to the swinging member 14 by the swinging shaft 72 penetrating the main body 22 from the connection member attaching hole 64 of the swinging member 14 into the swinging member attaching hole 82 of the connection member 18.

The guide hole 28 of the stationary gripping body 12 is formed so as to have a height approximately equal to the height of the supporting shaft hole 30, and the stationary gripping body attaching hole 60 of the swinging member 14 is formed to have a height approximately equal to those of the supporting shaft hole 30 and the guide hole 28 of the stationary gripping body 12. Therefore, the connection member 18 attached to the connection member attaching hole 64 formed below the stationary gripping body attaching hole 60 of the swinging member 14 is inserted through the connection member 18 of the stationary gripping body 12 to rise toward the side of pulling the connection member 18 (the direction "a" shown in FIG. 15).

The connection member 18 may be brought into contact with an opening edge of the guide hole 28 on the side of pulling the connection member 18 (the direction "a" shown in FIG. 15) which is on a side departing from the supporting shaft hole 30 such that a force acting on the connection member main body 80 of the connection member 18 becomes small.

The supporting shaft 70 has a cylindrical shape having an axial center 70a extending in a lengthwise direction, and it is provided with a flange portion 70b projecting in a direction intersecting the axial center 70a at a near side thereof. The supporting shaft 70 is inserted into the fixed gripping body attaching hole 60 of the swinging member 14, a flange portion 70b is joined around the stationary gripping body attaching hole 60 and it is screwed to the supporting shaft hole 30 of the stationary gripping body 12, so that it is attached to the stationary gripping body 12 and the swinging member 14. The axial center 70a of the supporting shaft 70 constitutes the center of rotation of the swinging member 14. The supporting shaft 70 may be caulked on the far-side of the supporting shaft hole 30.

The swinging shaft 72 has a cylindrical shape having an axial center 72a extending in a lengthwise direction, and it is provided with a flange 72b projecting in a direction intersecting the axial center 72a on a near side thereof. The swinging shaft 72 is fitted in the connection member attaching hole 64 of the swinging member 14 from the near side thereof, it is fitted into the swinging member attaching hole 82 of the connection member 18 from the near side, it is caulked on the far side of the swinging member attaching hole 82, so that it is attached to the swinging member 14 and the connection member 18. The axial center 72a of the swinging shaft 72 constitutes the center of rotation of the connection member 18.

The swinging shaft 74 has a cylindrical shape having an axial center 74a extending in a lengthwise direction, and it is provided with a flange portion 74b projecting in a direction intersecting the axial center 74a on the far side. The swinging shaft 74 is inserted from the other movable gripping body attaching hole 98 of the movable gripping body 16 on the far side into the movable gripping body attaching hole 62 of the swinging member 14 and it is inserted into one swinging member attaching hole 96, the flange portion 74b is joined around the other swinging member attaching hole 98 and it is fixed by a cotter pin 76 in a region projecting on the near side of the one swinging member attaching hole 96 on the near side of the movable gripping body 16. The axial center 74a of the swinging shaft 74 constitutes the center of rotation of the movable gripping body 16.

An outer periphery of the other swinging member attaching hole 98 on the far side has a step difference formed in an annular shape in a circumferential direction. The surface of the flange portion 74b of the swinging shaft 74 on the far side is constituted such that when the flange portion 74b of the swinging shaft 74 is inserted into the annular step difference portion 98a, the surface of the flange portion 74b becomes flush with the far-side face of the other swinging member attaching portion 94.

The supporting shaft hole 30 and the stationary gripping body attaching hole 60 of the swinging member 14 have the same diameter, and they are arranged in parallel such that outer peripheral edges thereof are parallel to each other.

A direction of extension of the peripheral edge of the supporting hole 30 and a direction of extension of the peripheral edges of the stationary gripping body attaching hole 60, the movable gripping body attaching hole 62 and the connection member attaching hole 64 are parallel to each other, the direction of extension of the peripheral edge of the supporting shaft hole 30 and the direction of extension of the peripheral edges of the stationary gripping body attaching hole 60, the movable gripping body attaching hole 62 and the connection member attaching hole 64 are parallel to the axial center 70a of the supporting shaft 70, the axial center 72a of the swinging shaft 72, and the axial center 74a of the swinging shaft 74.

A biasing member 110 composed of a coil spring for biasing the swinging member 14 to the side where the connection member 18 is pulled is provided between the stationary gripping body 12 and the swinging member 14.

The biasing member 110 is arranged such that a coil portion 112 thereof is fitted into a spring groove 44 of the stationary gripping body 12.

The biasing member 110 is arranged such that a linear first hooking portion 114 extending from the coil portion 112 on the near side is fixed to a catching hole 66 of the swinging member 14 formed on the far-side face, and a linear second hooking portion 116 extending from the coil portion 112 on the far side is fixed to a catching hole 48 of the stationary gripping body 12 formed on the near-side face of the main body 22.

Figure 15:
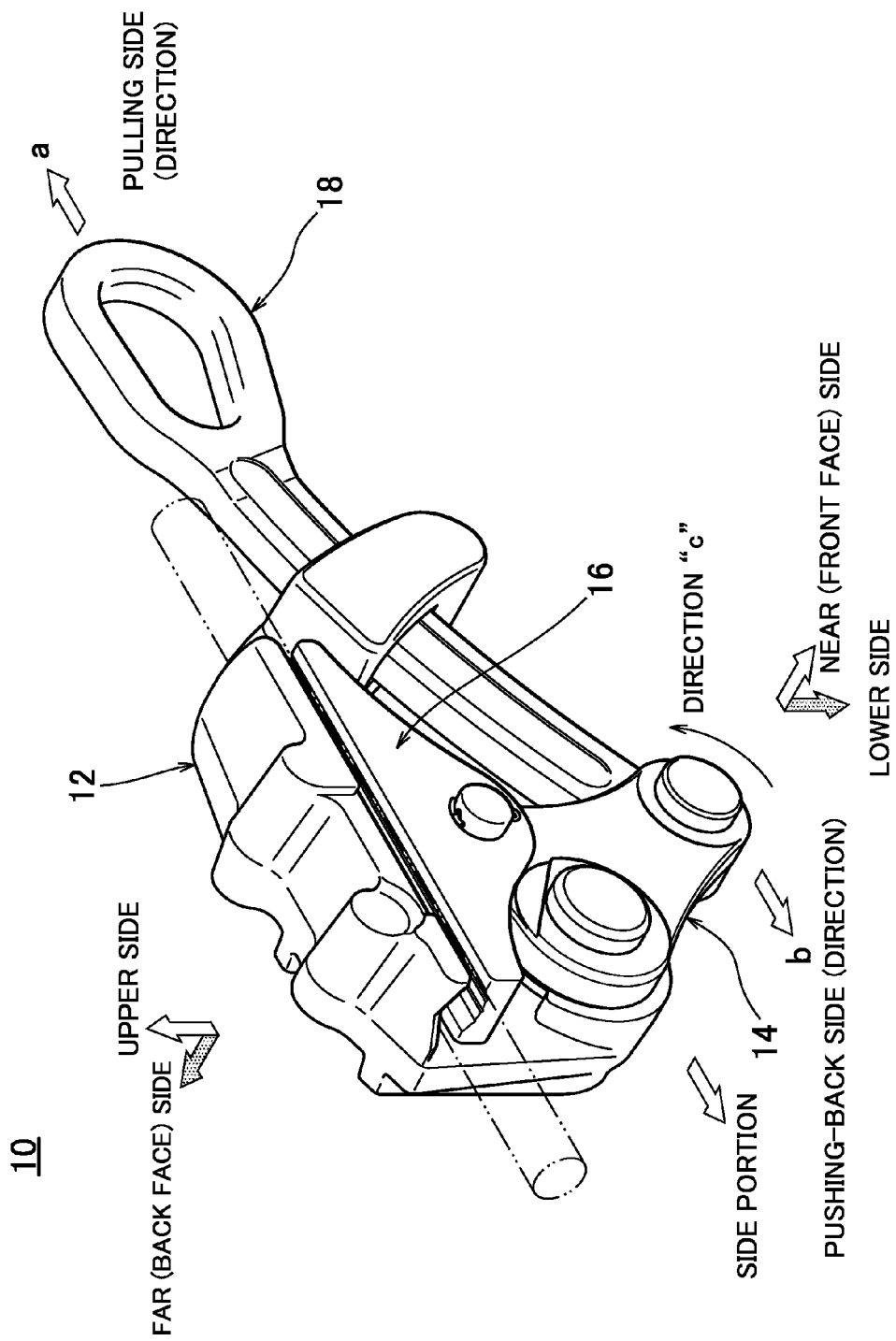
FIG. 15 is an explanatory view of a wire gripper.

The first hooking portion 114 is fixed in the catching hole 66 of the swinging member 14 in a state where the connection member 18 has been pulled in a non-loaded state, and the biasing member 110 biases the connection member 18 in such a state that the connection member 18 has been pulled from a side of pushing back the connection member 18 in a pulling-back direction (the direction "b" shown in FIG. 15) to a side of pulling the connection member 18 (the direction "a" shown in FIG. 15).

The ridge 40 of the stationary gripping body 12 is not formed within an operation range of the first hooking portion 114, it is provided with a space 42, and it is provided so as to extend from a lower portion of the supporting shaft hole 30 to a front portion thereof.

Figure 11:
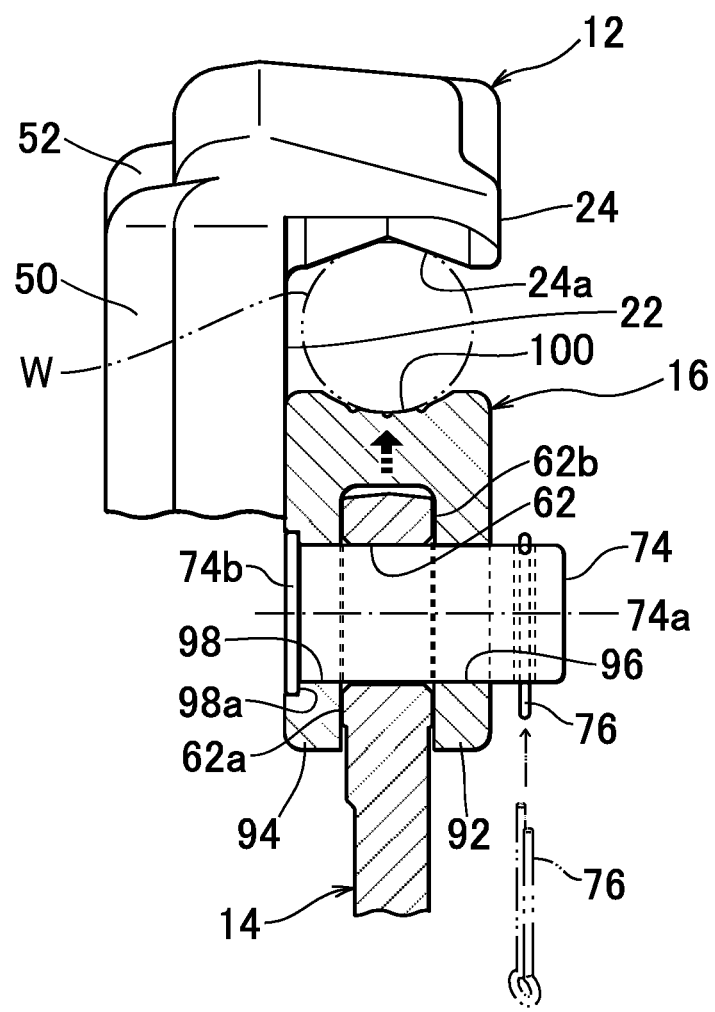
FIG. 11 is a side illustration view showing an attached state of the stationary gripping body and a movable gripping body.
Figure 12:
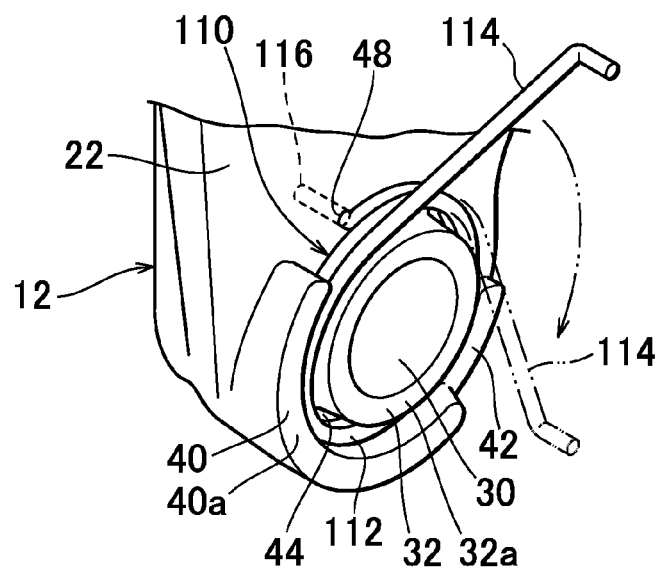
FIG. 12 is a perspective illustration view showing an attached state of a biasing member.
Figure 13:
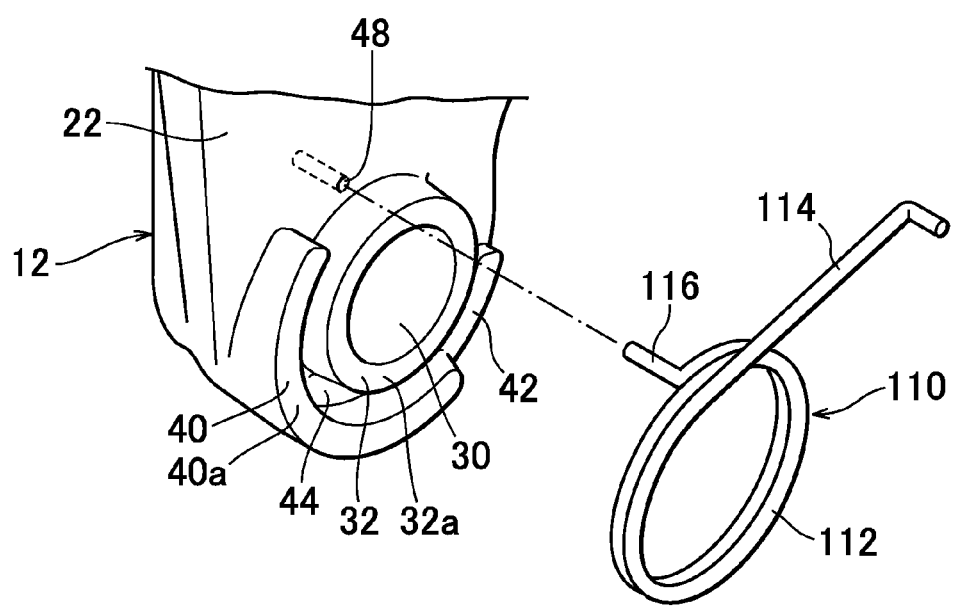
FIG. 13 is a perspective illustration view showing an attached state of the biasing member.
Figure 14:
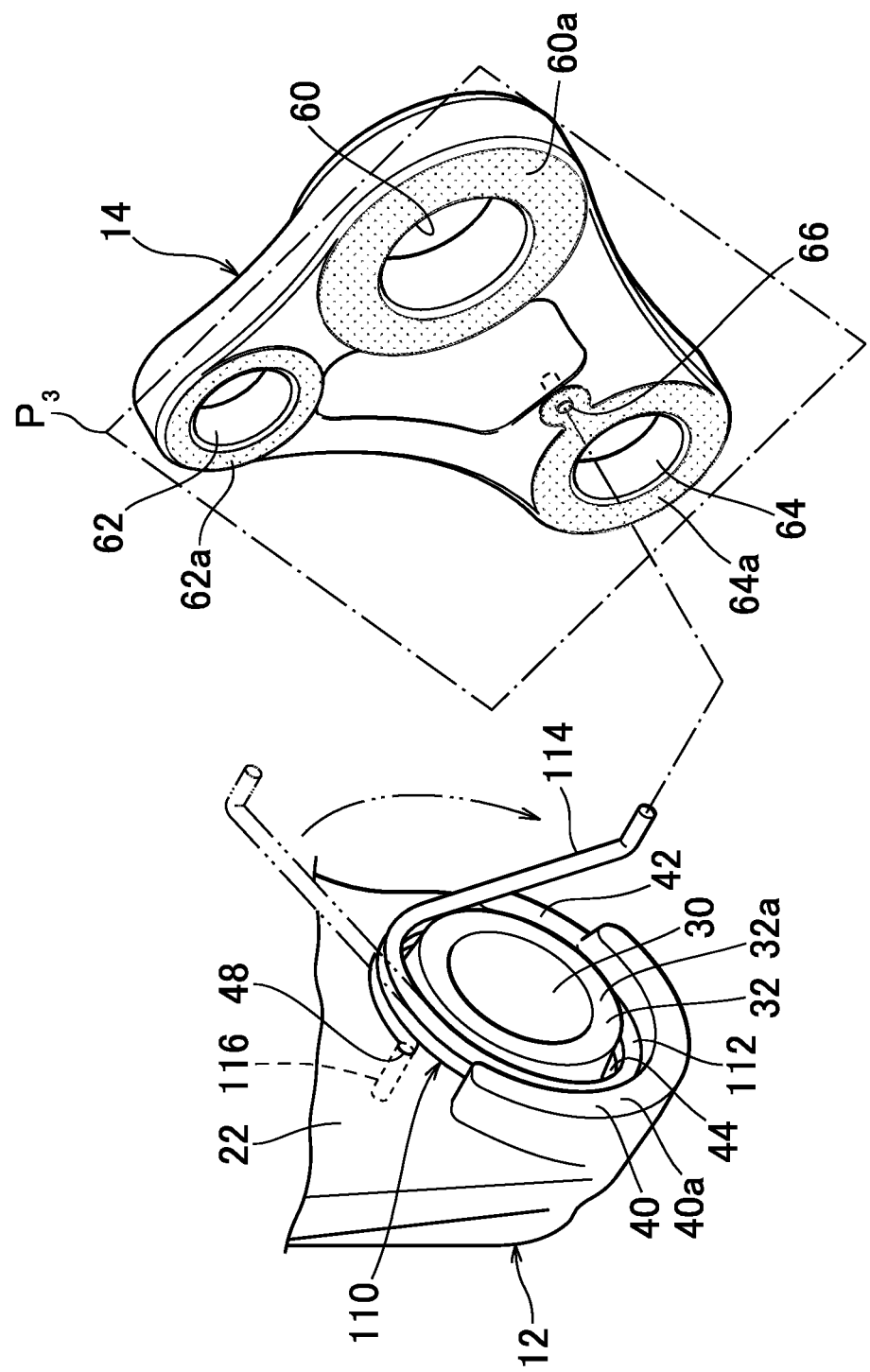
FIG. 14 is a perspective illustration view showing an attached state of the biasing member.

As shown in FIG. 11, the movable gripping body 16 is formed in a U shape in a section, it is provided with one swinging member attaching portion 92 and the other swinging member attaching portion 94 arranged in parallel before and after, and the one swinging member attaching hole 96 is bored in the one swinging member attaching portion 92, while the other swinging member attaching hole 98 is bored in the other swinging member attaching portion 94.

The movable gripping member 16 is formed with the clamping groove 100 receiving a lower portion of a wire-like body W on an upper face thereof such that the clamping groove 100 faces the clamping groove 24a formed on the lower face of the stationary gripping body 12.

The movable gripping body 16 is attached to the swinging member 14 such the one swinging member attaching portion 92 and the other swinging member attaching portion 94 are caused to stride over an upper portion of a rear portion of the swinging member 14, and the one swinging member attaching hole 96, the other swinging member attaching hole 98, and the movable gripping body attaching hole 62 of the swinging member 14 are aligned with one another in parallel.

The movable gripping body 16 is swingably attached to the swinging member 14 by the swinging shaft 74 inserted into the one swinging member attaching portion 96, the other swinging member attaching portion 98 and the movable gripping body attaching hole 62 which are aligned with one another.

The movable gripping body attaching hole 62 of the swinging member 14, and the one swinging member attaching hole 96 and the other swinging member attaching hole 98 of the movable gripping body 16 have the same diameter and they are arranged such that outer peripheral edges of their holes are in parallel.

Faces of the one swinging member attaching portion 92 and the other swinging member attaching portion 94 facing each other (inner faces of the one swinging member attaching portion 92 and the other swinging member attaching portion 94) are vertical faces parallel to each other, and attaching to the swinging member 14 which is performed such that the faces are parallel to the top portion 32a of the ridge 32 and the top portion 40a of the ridge 40

The faces of the one swinging member attaching portion 92 and the other swinging member attaching portion 94 facing each other (inner faces of the one swinging member attaching portion 92 and the other swinging member attaching portion 94) are orthogonal to directions of extensions of the outer peripheral edges of the holes of the one swinging member attaching portion 96 and the other swinging member attaching portion 98 and are orthogonal to the axial center 74a of the swinging shaft 74.

The movable gripping body 16 attached to the swinging member 14 is swung about the axial center 74a of the swinging shaft 74.

A swinging range of the movable gripping body 16 can be set to swinging in such a degree that deviation from a state that an upper face of the movable gripping body 16 becomes parallel to the lower face of the wire-like body pressing-down portion 24 of the stationary gripping body 12 due to swinging of the swinging member 14 is corrected, so that the swinging range is restricted.

The movable gripping body 16 is attached to the swinging member 14 such that the clamping groove 100 thereof is positioned just below the clamping groove 24a of the stationary gripping body 12 and the clamping groove 100 of the movable gripping body 16 and the clamping groove 24a of the stationary gripping body 12 face each other.

The swinging member 14 is attached to the near side of the top portion 32a of the ridge 32 and the near side of the top portion 40a of the ridge 40 of the stationary gripping body 12 such that the clamping groove 100 of the movable gripping body 16 attached to the swinging member 14 is positioned just below the clamping groove 24a of the stationary gripping body 12 and the clamping groove 100 of the movable gripping body 16 and the clamping groove 24a of the stationary gripping body 12 face each other.

The connection member 18 is attached to the swinging member 14 such that the connection member main body 80 are parallel to the top portion 32a of the ridge 32 and the top portion 40a of the ridge 40 and extends along a direction where the clamping groove 24a of the stationary gripping body 12 and the clamping groove 100 of the movable gripping body 16 extend below the ridge 32 and the ridge 40 of the stationary gripping body 12. The connection member 18 is swung about the axial center 72a of the swinging shaft 72.

The ridge 32 and the ridge 40 of the stationary gripping body 12 are formed to have fixed heights such that the near-side faces thereof (the sliding contact faces of the top portion 32a and the top portion 40a facing the top portion 60a of the bulging portion around the hole of the stationary gripping body attaching hole 60 of the swinging member 14) are parallel to a direction in which the clamping groove 24a of the stationary gripping body 12 extends below the clamping groove 24a of the stationary gripping body 12 and are orthogonal to the axial center 70a of the supporting shaft 70 below the clamping groove 24a of the stationary gripping body 12.

The sliding contact faces of the top portion 32a of the ridge 32 and the top portion 40a of the ridge 40 are parallel faces facing the sliding contact faces of the top portions of the bulging portions around the holes of the stationary gripping body attaching hole 60, the movable gripping body attaching hole 62 and the connection member attaching hole 64 (the top portion 60a of the bulging portion around the far-side hole, the top portion 62a of the bulging portion around the far-side hole, the top portion 64a of the bulging portion around the far-side hole, the top portion 60b of the bulging portion around the near-side hole, the top portion 62b of the bulging portion around the near-side hole, and the top portion 64b of the bulging portion around the near-side hole). Then, the top portion 32a of the ridge 32, the top portion 40a of the ridge 40, and the bulging portion around the stationary gripping body attaching hole 60 (the top portion 60a of the bulging portion around the far-side hole) are in surface contact with each other so as to swing the swinging member 14 about the axial center 70a of the swinging shaft 70.

A vertical plane face $P_1$ coming in contact with the top portion 32a of the ridge 32 and the top portion 40a of the ridge 40 is configured so as to passing inside the guide hole 28 of the connection member guiding portion 26.

A vertical plane face $P_2$ passing through the near-side face of the swinging member 14 around the stationary gripping body attaching hole 60 and the near-side face thereof around the movable gripping body attaching hole 62 (the sliding contact face of the top portion 62b of the budging portion around the near-side hole) and a vertical plane face $P_3$ passing through the far-side face of the swinging member 14 around the stationary gripping body attaching hole 60 and the far-side face thereof around the movable gripping body attaching hole 62 (the sliding contact face of the top portion 62a of the bulging portion around the far-side hole) are perpendicular to the axial center 70a of the swinging shaft 70, the axial center 72a of the swinging shaft 72 and the axial center 74a of the swinging shaft 74 and are parallel to the clamping groove 24a of the stationary gripping body 12. Such a configuration is adopted that the vertical plane face $P_3$ passing through the far-side face of the swinging member 14 around the stationary gripping body attaching hole 60 and the far-side face of the movable gripping body attaching hole 62 attached with the connection member 18 (the sliding contact face of the top portion 64a of the bulging portion around the far-side hole) is perpendicular to the axial center 72a of the swinging shaft 72 and the axial center 74a of the swinging shaft 74 and passes through inside of the guide hole 28 of the connection member guiding portion 26.

The plane face $P_1$ coming in contact with the top portion 32a of the ridge 32 and the top portion 40a of the ridge 40, the plane face $P_2$ passing through the fur-side face around the movable gripping body attaching hole 62 (the sliding contact face of the top portion 62b of the bulging portion around the near-side hole), and the plane face $P_3$ passing through the far-side face around the stationary gripping body attaching hole 60 (the sliding-contact face of the top portion 60a of the bulging portion around the far-side hole) and the far-side face around the movable gripping body attaching hole 62 (the sliding-contact face of the top portion 62a of the bulging portion around the far-side hole) are parallel to each other, and they constitute vertical faces to the axial center 70a of the swinging shaft 70, the axial center 72a of the swinging shaft 72 and the axial center 74a of the swinging shaft 74.

A procedure for attaching and detaching the wire gripper 10 constituted above to and from the wire-like body W will be described below.

First of all, a state where the movable gripping body 16 has been sufficiently spaced from the stationary gripping body 12 is obtained by pushing the connection member 18 toward the pushing-back side (in the direction "b" shown in FIG. 15), so that it is made easy to insert the wire-like body W between the stationary gripping body 12 and the movable gripping body 16.

Figure 8:
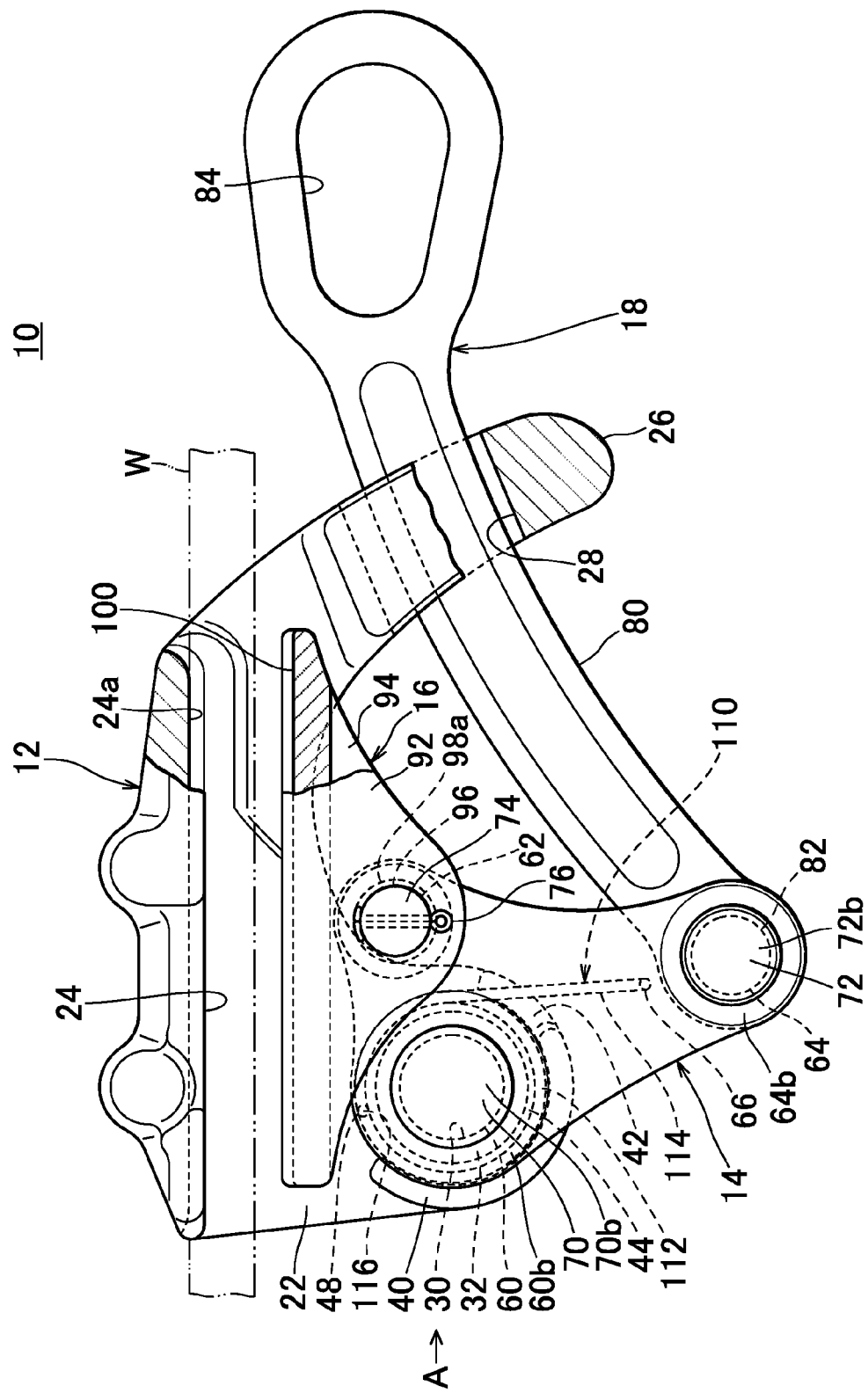
FIG. 8 is a front illustration view showing an operation state of the wire gripper.
Figure 9:
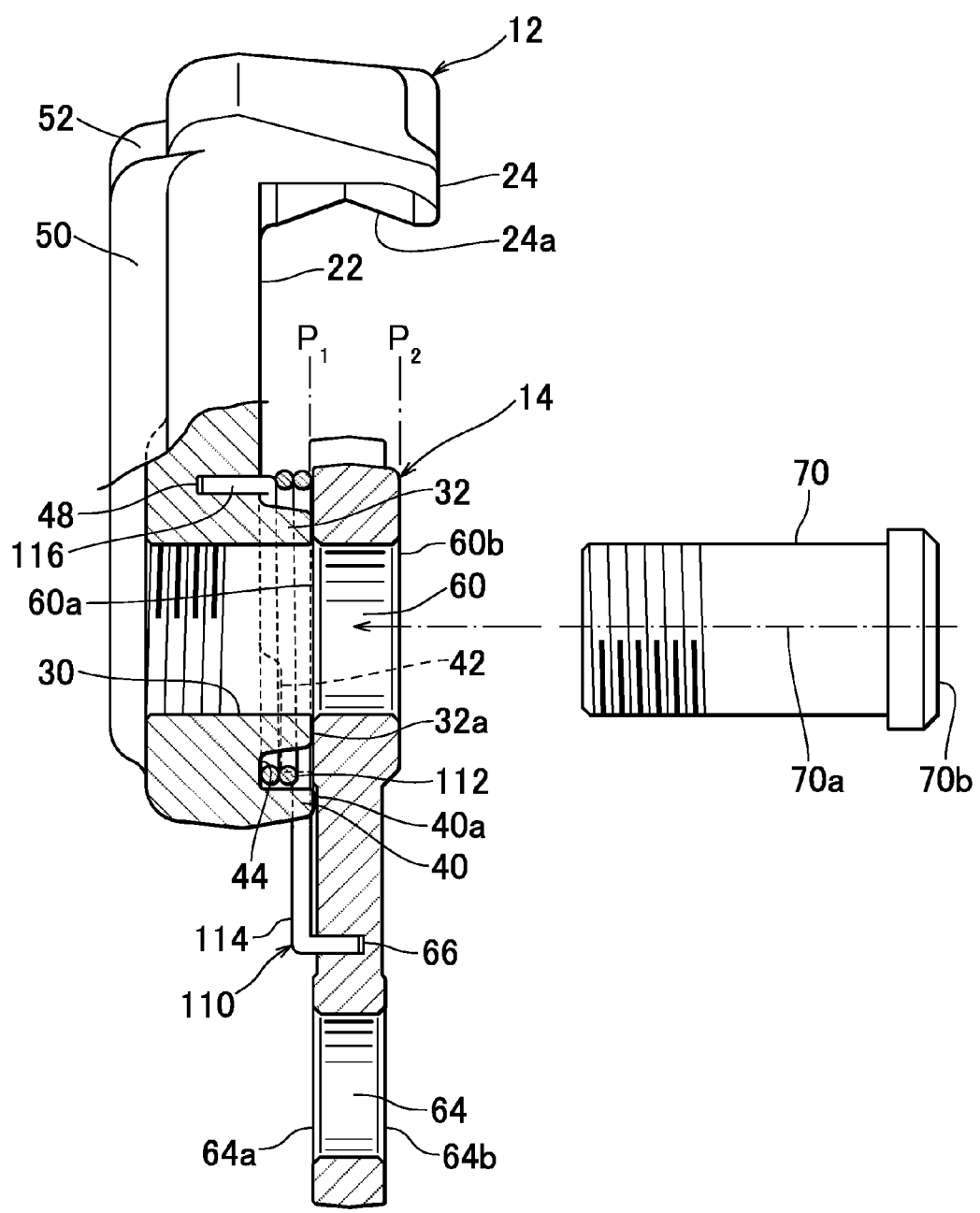
FIG. 9 is a sectional illustration view showing an attached state of the stationary gripping body and a swinging member.
Figure 10A:
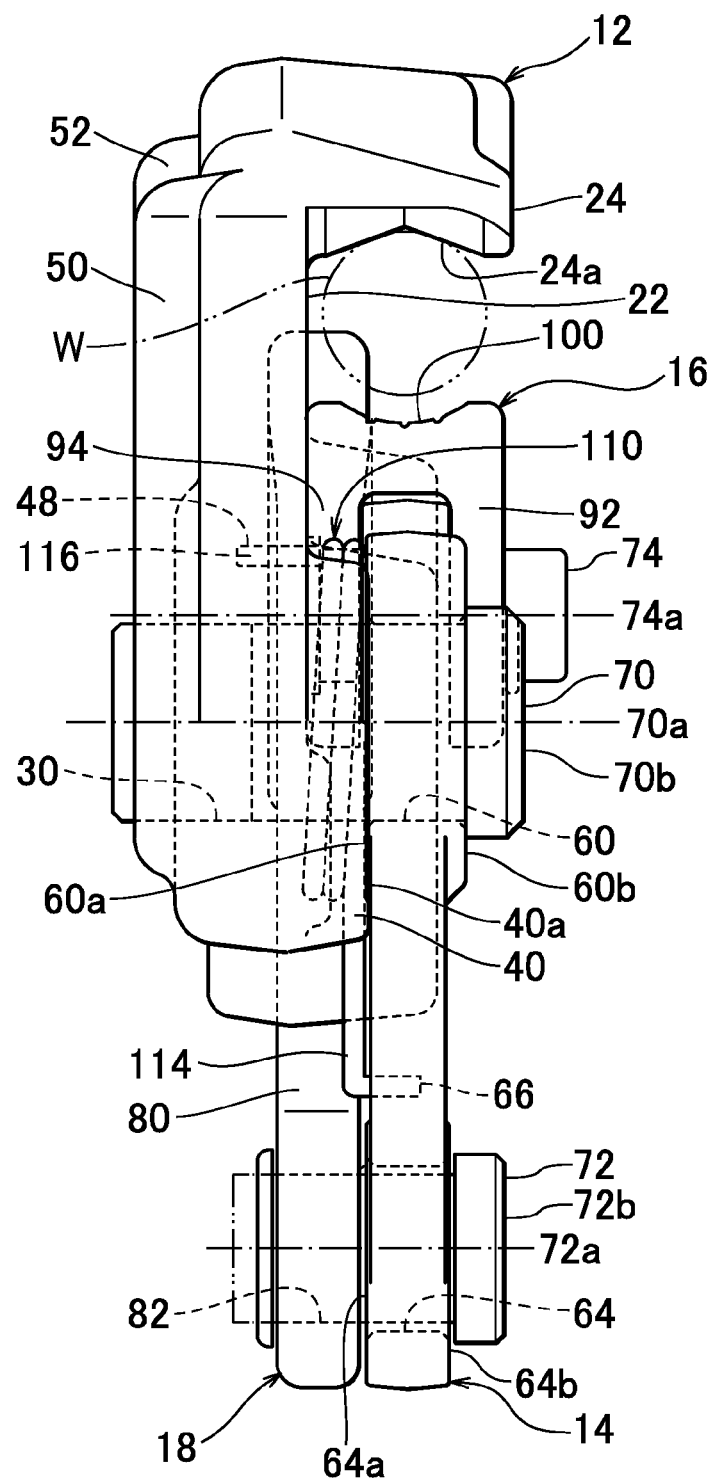
FIG. 10A is an illustration view taken in a direction of arrow in FIG. 8A.
Figure 10B:
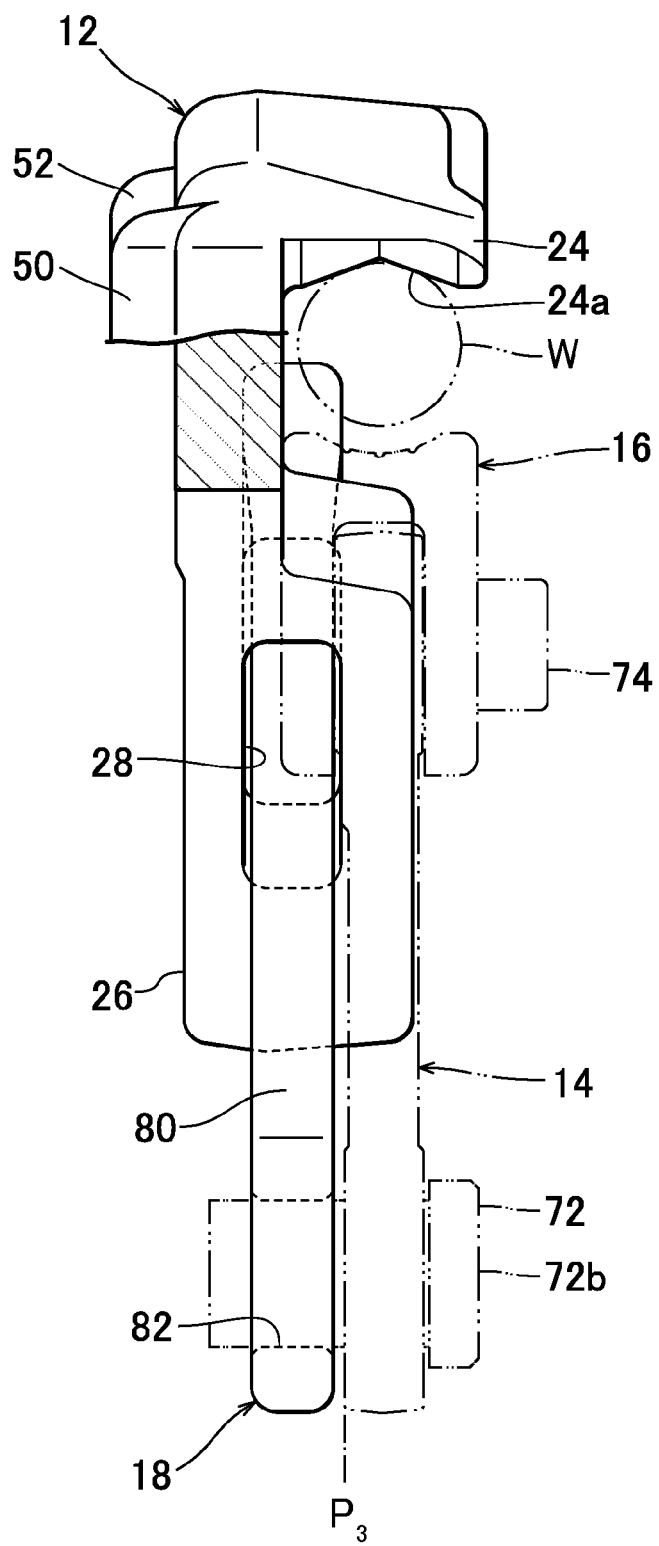
FIG. 10B is an illustration view taken in a direction of arrow in FIG. 8A.

As shown in FIG. 8, the wire gripper 10 where the stationary gripping body 12 and the movable gripping body 16 have been spaced from each other sufficiently is carried to a predetermined region of the wire-like body W, the wire-like body W is inserted between the stationary gripping body 12 and the movable gripping body 16, and an upper portion of the wire-like body W is received in the clamping groove 24a formed on the lower face of the stationary gripping body 12, so that a state where the wire gripper 10 has been hung by the wire-like body W is achieved.

When the attaching of the wire gripper 10 to the wire-like body W is applied to an electrical wire-allocating work, the wire grippers 10 are attached to two portions of a wire at an interval corresponding to a length of a wire-tensioning apparatus functioning to pull up an electrical wire from both sides of the wire-tensioning apparatus, respectively. Connecting means for connecting to the wire gripper 10 utilizing a connection hole 84 formed in the connection member 18 are provided at both ends of the wire-tensioning apparatus. After the wire-tensioning apparatus is connected to the wire grippers 10 positioned on the both sides at both the ends thereof, a force of pulling the electrical wire in the direction "a" shown in FIG. 15 is applied to the connection members 18 of the wire grippers 10 according to an operation for shortening the length between the both ends.

Figure 7:
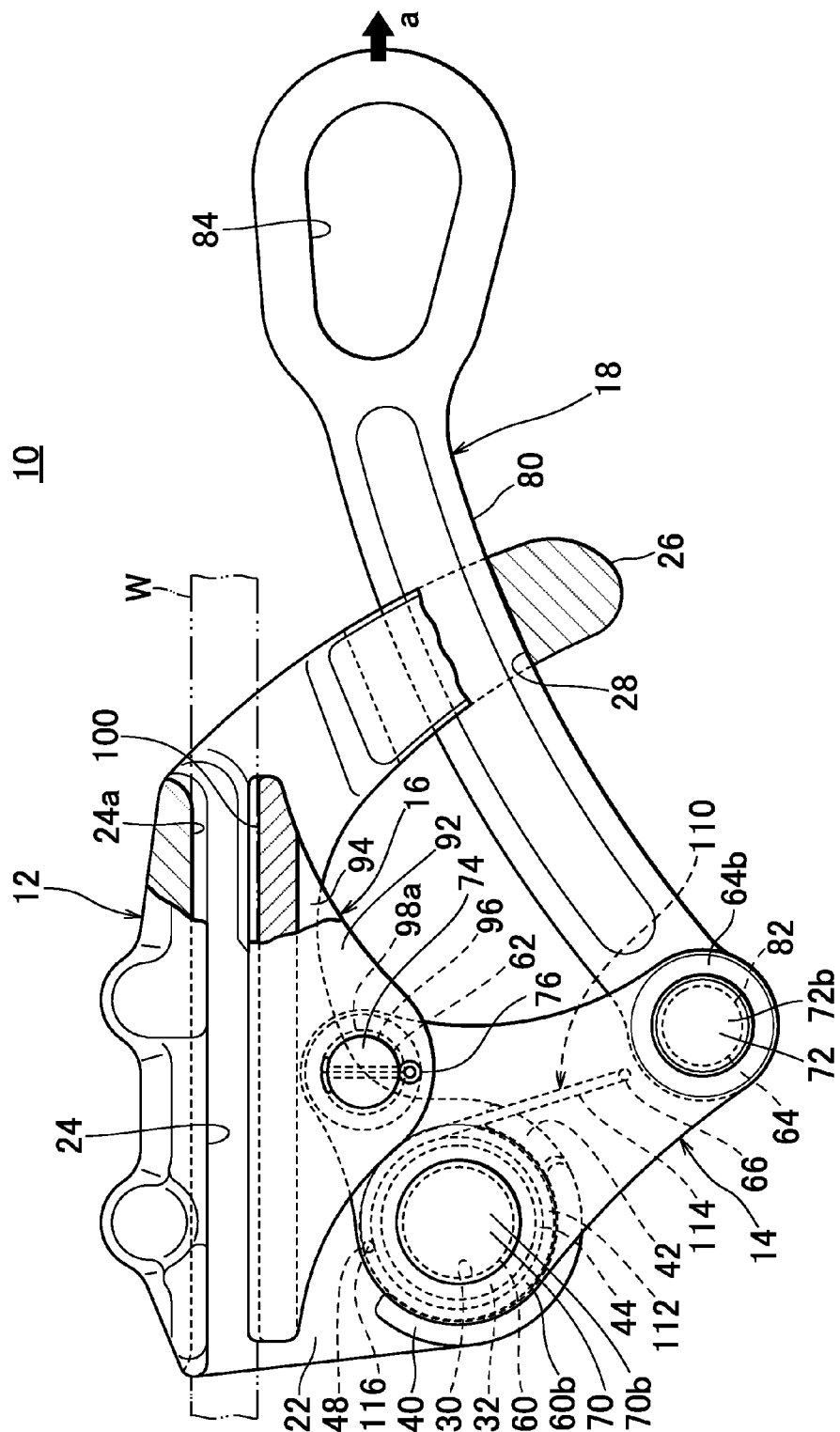
FIG. 7 is a front illustration view showing an operation state of the wire gripper.

When the connection member 18 is pulled in the direction "a" shown in FIG. 15, the swinging member 14 connected with one end side of the connection member 18 is swung in a direction "c" shown in FIG. 15 about the supporting shaft 70. According to the swinging of the swinging member 14, the movable gripping body 16 is pushed up in the direction of the stationary gripping body 12 and a lower portion of the wire-like body W is received in the clamping groove 100, so that the wire-like body W is clamped between the movable gripping body 16 and the stationary gripping body 12 to be gripped therebetween, as shown in FIG. 7.

When a pulling force in the direction "a" shown in FIG. 15 is further applied to the electrical wire by the wire-tensioning apparatus, since the wire-like body W gripped by the wire gripper 10 is pulled in direction "a" shown in FIG. 15, the wire grippers 10 on the both sides are pulled up to each other, and a portion of the wire-like body W positioned between the wire grippers 10 on the both sides is put in a loosened state, so that a state where the electrical wire-allocating work can be carried out is obtained.

As described above, in the attaching work of the wire grippers 10, a work of attaching the wire grippers 10 to the wire-like body W and a work of connecting the pulling means such as the wire-tensioning apparatus to the connection members 18 can be all performed on a front face side, so that the work for allocating a wire or the like is a high place work, and the work which is also a dangerous work can be performed easily and safely.

When the wire gripper 10 attached to the wire-like body W is detached therefrom, the movable gripping body 16 is separated from the wire-like body W by releasing the connected state achieved by the wire-tensioning apparatus which has been connected to the connection member 18 or the like, so that gripping of the wire-like body W can be released.

INDUSTRIAL APPLICABILITY

The wire gripper according to the present invention can be applied to not only an electrical wire but also a wire-like body pulling a grapevine trellis or tree, or the like.

EXPLANATION OF REFERENCE SIGN

10 wire gripper
12 stationary gripping body
14 swinging member
16 movable gripping body
18 connection member
22 main body
24 wire-like body pressing-down portion
24a, 100 clamping groove
26 connection member guiding portion
28 guide hole
30 supporting shaft hole
32, 40 ridge
32a, 40a top portion
42 space
44 spring groove
48, 66 catching hole
50 first linear ridge
52 second linear ridge
60 stationary gripping body attaching hole
60a, 62a, 64a top portion of bulging portion around a far-side hole
60b, 62b, 64b top portion of bulging portion around a near-side hole
62 movable gripping body attaching hole
64 connection member attaching hole
70 supporting shaft
70a, 72a, 74a axial center
70b, 72b, 74b flange portion
72, 74 swinging shaft
76 cotter pin
80 connection member main body
82 swinging member attaching hole
84 connection hole
92 one swinging member attaching hole
94 the other swinging member attaching hole
96 one swinging member attaching hole
98 the other swinging member attaching hole
98a step difference portion
110 biasing member
112 coil portion
114 first hooking portion
116 second hooking portion
W wire-like body

The invention claimed is:

1. A wire gripper, comprising:
   a stationary gripping body having a main body and a wire-like body pressing-down portion formed on an upper portion of the main body;
   a swinging member swingably attached to the stationary gripping body by a supporting shaft;
   a movable gripping body swung toward the wire-like body pressing-down portion of the stationary gripping body according to swinging of the swinging member and having a wire-like body holding portion; and
   a connection member connected to the swinging member and swinging the swinging member,
   wherein the stationary gripping body is provided with a circular ridge formed around a hole in which the supporting shaft for attaching the swinging member is inserted in order to protect the supporting shaft,
   an arc-shaped ridge is formed at a position spaced from the hole edge of the hole in which the supporting shaft is inserted along the hole edge separately from the circular ridge, and
   a spring groove is formed between the circular ridge and the arc-shaped ridge.

2. The wire gripper according to claim 1, further comprising an arc-shaped ridge different from the circular ridge, formed at a position spaced from a hole edge of the hole in which the supporting shaft is inserted along the hole edge.

3. A wire gripper, comprising:
   a stationary gripping body having a main body and a wire-like body pressing-down portion formed on an upper portion of the main body;
   a swinging member swingably attached to the stationary gripping body by a supporting shaft;
   a movable gripping body swung toward the wire-like body pressing-down portion of the stationary gripping body according to swinging of the swinging member and having a wire-like body holding portion; and
   a connection member connected to the swinging member and swinging the swinging member,
   wherein the stationary gripping body is provided with a linear ridge extending toward the wire-like pressing-down portion in the vicinity of a hole in which a supporting shaft for attaching the swinging member is inserted, and the wire gripper further comprises a plurality of ridges provided at intervals from a hole edge of the hole.

4. The wire gripper according to claim 1, wherein the circular ridge is provided on a side attached with the connection member, and the ridge extending toward the wire-like body pressing-down portion is provided on a side opposite to the side attached with the connection member.

* * * * *